United States Patent
Ringdal et al.

[11] Patent Number: 5,954,389
[45] Date of Patent: *Sep. 21, 1999

[54] REINFORCED FRONT PART FOR USE IN THE MANUFACTURE OF CABINS/BODIES FOR VEHICLES

[75] Inventors: Lars Ringdal, deceased, late of Oslo, by Judith R Ringdal, legal representative; Jan Otto Ringdal, Oslo, both of Norway

[73] Assignee: A.S. Ringdal Patenter, Oslo, Norway

[*] Notice: This patent issued on a continued prosecution application filed under 37 CFR 1.53(d), and is subject to the twenty year patent term provisions of 35 U.S.C. 154(a)(2).

[21] Appl. No.: 08/545,756
[22] PCT Filed: May 6, 1994
[86] PCT No.: PCT/NO94/00087
   § 371 Date: Dec. 13, 1996
   § 102(e) Date: Dec. 13, 1996
[87] PCT Pub. No.: WO94/26575
   PCT Pub. Date: Nov. 24, 1994

[30] Foreign Application Priority Data

May 7, 1993 [NO] Norway ..................... 931686

[51] Int. Cl.[6] .................................................. B62D 25/20
[52] U.S. Cl. .......................... 296/193; 296/186; 296/901
[58] Field of Search .................................. 296/901, 185, 296/186, 193

[56] References Cited

U.S. PATENT DOCUMENTS

| | | | |
|---|---|---|---|
| 2,814,524 | 11/1957 | Porsche et al. | 296/901 X |
| 2,876,037 | 3/1959 | Ingolia et al. | 296/901 X |
| 2,973,220 | 2/1961 | White | 296/901 X |
| 3,023,045 | 2/1962 | Cirami | 296/901 X |
| 3,331,627 | 7/1967 | Schroder et al. | 296/901 X |
| 3,550,948 | 12/1970 | Thompson, Jr. | 296/901 X |
| 4,491,362 | 1/1985 | Kennedy | 296/901 X |
| 4,521,049 | 6/1985 | Genma et al. | 296/185 |
| 4,553,783 | 11/1985 | Lagana | 296/901 X |
| 4,573,546 | 3/1986 | Irimajiri et al. | 296/185 X |
| 4,682,809 | 7/1987 | Huss | 296/901 X |
| 5,129,700 | 7/1992 | Trevisan et al. | 296/901 X |

FOREIGN PATENT DOCUMENTS

| | | |
|---|---|---|
| 1059556 | 2/1967 | United Kingdom . |
| 1253202 | 11/1971 | United Kingdom . |
| 1274643 | 5/1972 | United Kingdom . |

*Primary Examiner*—Joseph D. Pape
*Attorney, Agent, or Firm*—W. Warren Taltavull; Farkas & Manelli PLLC

[57] ABSTRACT

A reinforced front part of plastic, for use in the manufacture of cabins or bodies for vehicles in order to achieve rigidity, is molded or shaped as a box-shaped unit in one piece with an enclosure defined by at least five walls which serve as the front, bottom, bonnet, and side walls and with an open side to face the interior of the vehicle.

2 Claims, 1 Drawing Sheet

REINFORCED FRONT PART FOR USE IN THE MANUFACTURE OF CABINS/BODIES FOR VEHICLES

FIELD OF THE INVENTION

The invention concerns a reinforced front part of plastic for use in the manufacture of cabins/bodies for vehicles.

BACKGROUND OF THE INVENTION

In the manufacture of vehicles there has long been a desire to be able to manufacture bodies consisting of as few components as possible, thus enabling production to be carried out in the most rational and reasonable manner possible. At the same time there is a desire for such parts to have as much strength as possible in order to give the vehicle the required rigidity and above all safety for both passengers and surroundings. In recent years plastics materials have been increasingly employed in the manufacture of cabins or bodies for vehicles. To some extent only individual elements of plastic have been used, but the development of new and modern plastics materials, and the production processes currently available have made it possible to make relatively large plates and body parts which can be assembled according to the prior art and attached to a framework for bodies by means of methods such as riveting, screwing, gluing, etc. The weakness of the methods used to date, however, is that when plate or panel elements of this kind are of a certain size they tend to become pliable and unstable with regard to shape. Thus there has been a requirement to be able to manufacture construction parts, which by means of three-dimensional shape reduce the number of panel elements which have to be employed in the construction of a body, while at the same time this three-dimnensional shape gives the construction element the greatest possible inherent strength. By means of a design of this kind it will also be possible to achieve a weight saving since the use of a heavy and expensive framework can be avoided.

This desire to provide larger body parts with a three-dimensional shape is particularly relevant in connection with the development of small, light vehicles, especially such as those designed to be powered electrically or operated with small, light engines. Body shape parts of this kind can constitute a front part or rear part of such vehicles and as the ultimate consequence of this, it could be envisaged that the entire vehicle body could be made in one piece, where only door and window elements have to be added.

SUMMARY OF THE INVENTION

The object of the present invention is to provide a shape part, and especially a front part for use in the manufacture of a vehicle body or a vehicle cabin, where this front part will be able to fulfill the desired requirements for stability of shape and safety for the user of the vehicle, while at the same time the front part will be able to be manufactured in the simplest possible way in a moulding operation. A further object of the invention is to provide a reinforced front part which while fulfilling the rigidity and safety requirements is also as light as possible. The front part will also provide the possibility of fitting and mounting the elements which are required in this part of the body.

This object is achieved with a front part which is characterized by the features in the patent claims presented.

There are known in the prior art a number of proposals for the manufacture of body parts of plastics material produced in relatively large units. Thus, e.g., from European patent application no. 0 089 706 a method is known for manufacturing an open vehicle body possibly including the driver's seat, etc. with a volumetric structure of an elastic material. This construction, however, has no directly inherent rigidity and has to be inflated or filled with foam in order to provide safety for the user.

From GB patent publication no. 2 088 792 there is known a small vehicle which is based on the use of a traditional chassis frame, where the actual body part is composed of individual elements, including a downwardly open plastic part; these individual elements, however, have no inherent stability and only form a plate-shaped enclosure of a supporting frame construction to which the plate-shaped parts are attached. Similarly, European patent publication no. 0 494 562 describes body parts made of plastic, to some extent three-dimensional in form, but do not fulfill the requirements called for in the present invention, nor do they form a uniform front part of a vehicle, which makes it possible to achieve a rational, reasonable and effective production. In British patent no. 1 594 481 there are described plate elements for a bus body. Here body plate elements are mounted between a complete front part and a complete rear part of the body, but here too the same comments apply as in connection with the above-mentioned publications, viz that it is only "covering elements" which are involved which together form the outer shell of the vehicle. Thus none of these known designs provides a self-supported front piece for a vehicle which permits a highly effective production of a front part in which the most necessary elements for the use of the vehicle are integrated, i.e. for installing the necessary equipment, while at the same time due to its special design the front par gives this section of the vehicle satisfactory rigidity and strength.

The special feature of the front part according to the invention is that the front part is moulded in one piece with closed walls on five sides, while the front part is open on the side which is intended to form the interior of the vehicle. The front/bonnet side, i.e. that side which is intended to face forwards and upwards for the finished vehicle is designed with steps for installation of the windscreen and with the extension retracted which will form the vehicle's dashboard, or the basic part of it. The side plates include mudguards and can be made as long as desirable, i.e. they can end either in the area where doors have to be installed for connection with the rear construction part, or they can be taken right back to the end of the vehicle, depending to some extent on the moulding method.

By designing the front part with curved surfaces, angled sections and side surfaces including mudguards and the upper section in the form of steps and retracted comprising the vehicle's or dashboard's instrument panel, a three-dimensional, "edged" and angled construction part is obtained which by means of its three-dimensional shape will provide satisfactory rigidity both against twisting, side loads and front loads. This is further reinforced by the fact that the bottom section/the side of the front part will also be formed to partially enclose any engine or other technical components round the front suspension, thus keeping these closed outside the inner part of the front and cabin part. A reinforced front section has thereby been obtained, without the use of extra elements, beams, etc., thus giving this vital part of the body an inherent rigidity which it has not been possible to achieve until now without the use of additional constructions or the assembly of several parts.

By designing this part with weakening lines, grooves, etc., it will be a simple matter to cut out the necessary shapes for the placement of lights, ventilation devices and other necessary equipment. These cut-outs will be in surfaces, which will not affect the unit's strength characteristics to a noticeable degree.

The end of the rear edge of the dashboard is suitably designed in the shape of an approximate semi-circle. After cutting, the end behind the dashboard can be appropriately further reinforced by means of a reinforcing profile, e.g. a tube or the like which goes right across the cabin, and is attached on each side in a roll bar or door reinforcing profile. In order to secure/protect the driver and front seat passenger, it is thereby a requirement that a shock-absorbing material should be placed round or on a part of the reinforcing profile.

There is an increasing demand for modern products, including vehicles, to be able to recycle materials due to the state of the environment as well as considerations of resource and energy consumption. To enable this to be done, it is a requirement that recyclable materials should be chosen. In this case, therefore, recyclable types of plastic must be used and, e.g., not thermoset plastics.

It is also desirable, in the case where sandwich constructions of plastic (two or more layers) are employed, that these are of a uniform material, thus enabling them to be appropriately reemployed by means of recycling.

BRIEF DESCRIPTION OF THE DRAWINGS

The invention will now be described in more detail by means of an embodiment which is illustrated in the drawing, in which.

DETAILED DESCRIPTION OF THE INVENTION

In the attached drawing 1 refers generally to the front part closed on five sides, where the sixth, open side is indicated by the arrow 2. This is the side which is intended to be facing in towards the interior of the cabin. This front part is moulded, the side surface which is intended to constitute the front section of the vehicle being designed with an upwardly rising surface 3 which becomes an angled, upwardly turned surface area/step 4, which forms the basic part of or the entire dashboard which is indicated here by 5.

Figure 1:
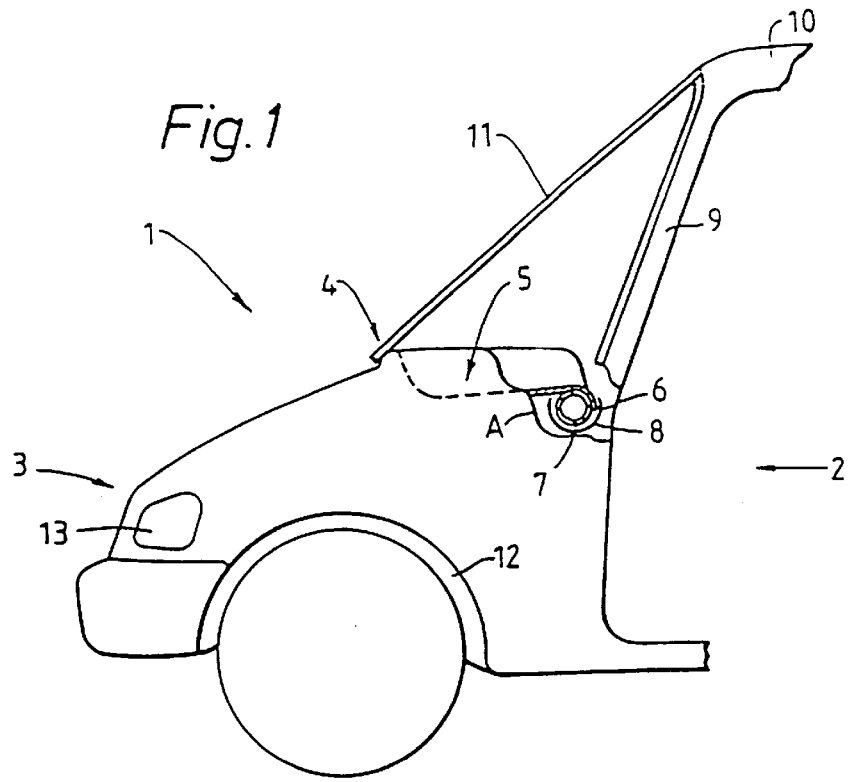
FIG. 1 is a purely schematic side view of a front part for a vehicle body according to the invention.

The part 5 which has to form the dashboard is terminated at the rear edge by a section which forms an approximate semi-circle 6. The semi-circle 6 at the rear edge of the dashboard can be reinforced if so desired by a reinforcing profile 7 which is completely or partially covered with a shock-absorbing material 8. The side surfaces comprise the mudguards 12 which are built-in or for which bulges are made. Furthermore the location point 13 for lights etc. is indicated. In order to illustrate these details the wall is cut out (illustrated by a wavy line A) in this area in FIG. 1. The front part is terminated here with a post-like part 9 which continues up to the roof 10. In FIG. 1 it is also indicated at 11 how a windscreen should be placed later on.

By means of this method the entire front section of a vehicle can be modelled in a mould, the front section being given a shape which enables the desired reinforcements of this section of the vehicle to be obtained. The invention eliminates many of the weaknesses which have previously been found in this section of the vehicle. The front section moulded in one piece and closed on five sides gives a far stronger and safer design than that in which pre-formed pieces of panels, plastic or steel plates have to be riveted, welded or glued together. The joining of a large number of parts can cause weakness in the construction and constitute a danger to passengers in the vehicle in the event of accidents and collisions. In addition it is difficult to combine the different properties of plastic and metals as a result of the great dissimilarities in strength, expansion, elasticity, etc. of the materials.

Figure 2:
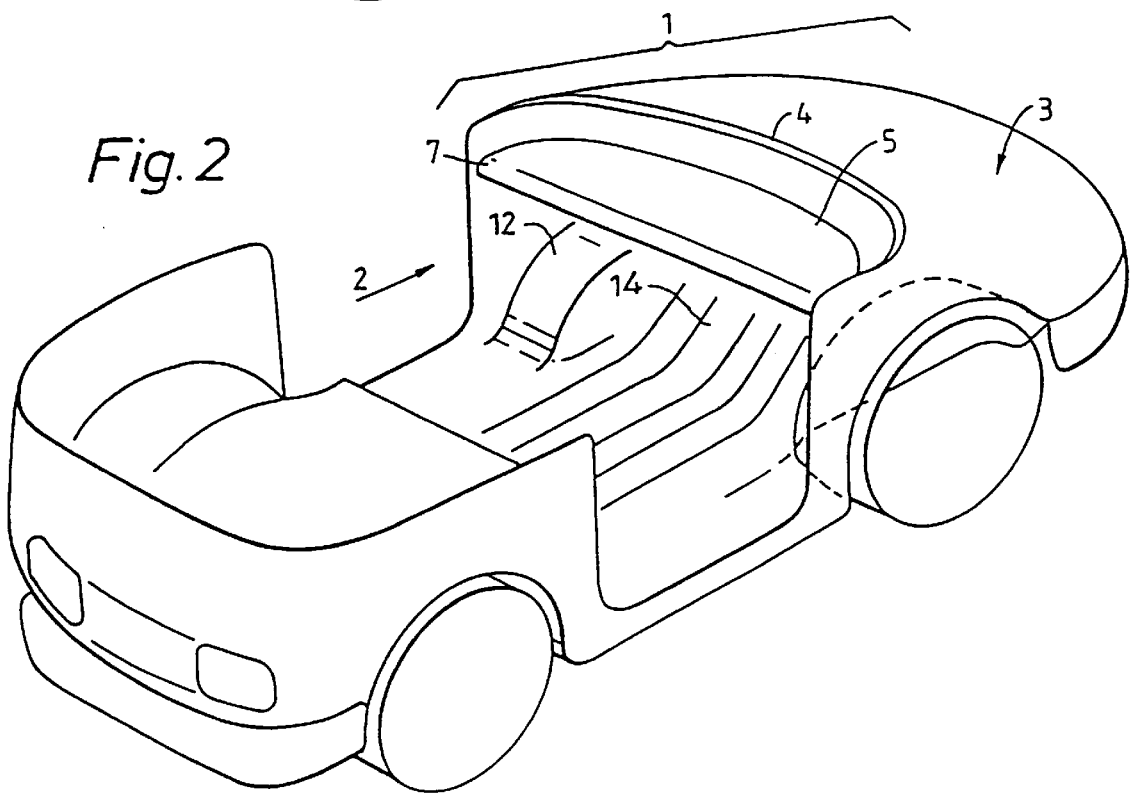
FIG. 2 is a schematic view of a vehicle body manufactured in one piece.

In FIG. 2 there is illustrated a second embodiment of the invention, where the front part is moulded in one piece with the rest of the body. With regard to the foremost part, i.e. the front part which is included in the reference number 1, this corresponds in principle to the version which is illustrated in FIG. 1, but in a perspective view and into the front part in the direction of the arrow 2.

This figure also shows the doubly curved surface 3 which gives the front part rigidity, with the graduated part and the location point for the dashboard 5 and the transition area 4, which will also constitute an attachment area for a windscreen. Moreover, this figure illustrates the graduations which are provided by the mudguards 12 which give an extra rigidity and also the employment of grooved or corrugated areas 14 in the bottom section. Under area 14 the vehicle's engine will be placed and lie isolated and separate from the interior of the vehicle. In the illustrated embodiment in FIG. 2 an open body without a roof is illustrated. Even a construction of this kind will have sufficient rigidity. In principle the illustrated vehicle can be envisaged with a roof installed on it.

In the embodiment there is only illustrated one possible design of the invention. It is obvious that this method will naturally be able to be adapted to other body shapes than that which is shown, e.g. open bodies or bodies with other angular shapes, etc. The essential factor is that by moulding the front part as a single piece in which the dashboard parts are integrated on the top and the mudguards on the side surfaces, a rigidity is obtained which gives the front part the desired characteristics, and that recyclable plastic is used. Thus many modifications will be possible within the scope of the invention and the front part can be extended backwards according to requirements and according to the moulding method used. The moulding methods which can be used include the rotational moulding technique, form blowing or thermoforming, or ordinary moulding can be employed. The usual equipment, such as bumpers, lights, etc. can be installed later on the front part.

We claim:

1. A front section of a vehicle of the type having a passenger compartment, said front section being molded in one piece with mutually reinforcing walls on at least five sides including a bottom wall, a top wall, two opposite side walls joining said top and bottom walls and each side wall extending from said top to said bottom wall, respectively, and a vehicle front wall, all of said walls being formed integrally to define a space closed on five sides and which is open in the direction of the passenger compartment of the vehicle.

2. The invention as claimed in claim 1 wherein said front wall includes a surface on said passenger compartment wall for further reinforcement, said surface including curvatures and a retracted section for the formation of a passenger compartment dashboard.

* * * * *